Patented June 23, 1936

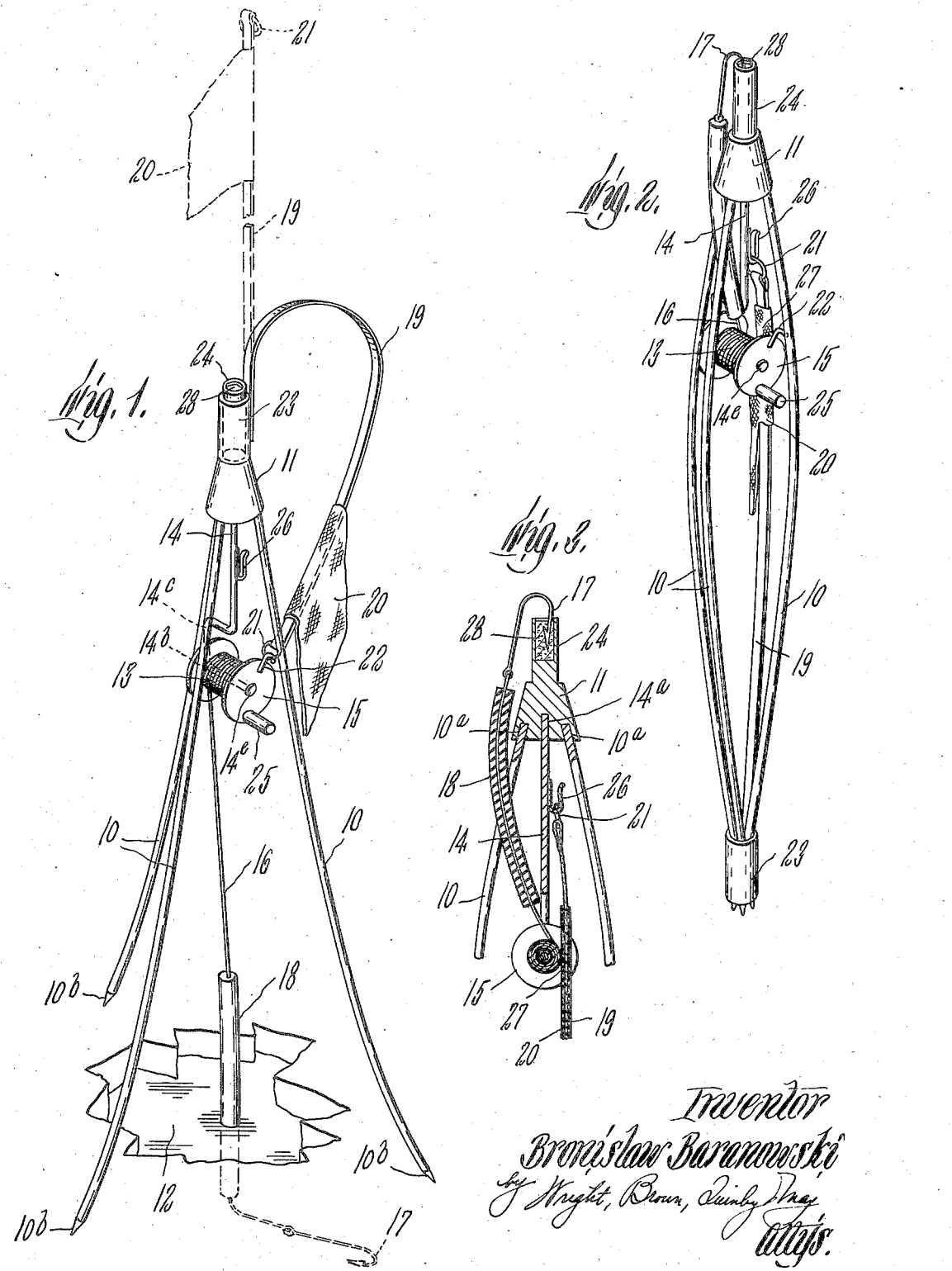

2,045,063

UNITED STATES PATENT OFFICE 2,045,063

TRAP FOR ICE-FISHING

Bronislaw Baranowski, Brockton, Mass.

Application November 4, 1935, Serial No. 48,190

3 Claims. (Cl. 43—16)

This invention relates to a fishing trap and more particularly to a trap designed for ice-fishing and characterized by the ease with which it can be collapsed into a small compass for transportation with little, if any, danger of losing its parts or tangling of its line; by the readiness with which it can be set up for fishing on the ice; by the fewness of its parts, including a flag strip adapted to be held in operative position by a collar or ferrule fixed thereto at its lower end and additionally adapted to hold the legs of the trap in collapsed condition while the strip is removably secured in inutile but readily accessible position in between the legs; by its stability on the ice and its positiveness of operation; and by its lightweight, sturdiness, and simplicity of construction.

The fishing trap of the present invention will now be described in detail with reference to the accompanying drawing wherein,—

Figure 1 depicts the trap in perspective as it is being used.

Figure 2 shows the trap in collapsed condition ready for transportation.

Figure 3 is a section through the upper portion of the collapsed trap.

The trap shown includes tri-pod legs 10 of stiffly or resiliently flexible metal, such as high carbon steel wire, projecting downwardly from a knob 11 of suitable cast metal, such as iron or lead. As appears best in Figure 3, the upper end portions 10a of the legs may be secured in the knob 11, as by being embedded or cast therein during its casting. By using steel wire of the appropriate composition and of sufficiently heavy gage, say, $\frac{1}{16}''$ to $\frac{1}{4}''$, for the legs, it is possible to realize therein the desired rigidity coupled with a resilient flexibility permitting them to be bent in collapsing the trap, as will presently be described. The lower end portions 10b of the legs may be sharpened to points to permit them to be engaged firmly in the ice surrounding the fishing hole 12.

The fishing tackle may include a conventional reel 13 supported for rotation somewhat below the knob 11 and in between the legs 10. For this purpose, there may be provided a bracket 14, as in the form of wire, whose upper end portion 14a may be embedded substantially centrally in the knob 11 and whose lower end portion 14b may be bent to pass horizontally through an axial opening in the reel 13 and afford the arbor on which the reel may freely rotate. In order to realize, as desired, a substantially central location of the reel 13 in between the legs 10, the bracket wire 14 may include a somewhat offset or outwardly bent portion 14c at its region immediately above the horizontal arbor portion 14b whose end 14e may be headed or sufficiently flanged over an end disc 15 of the reel to keep the reel from moving laterally off such arbor portion. The line 16, which is wound on the reel and provided as customarily with fish hook 17 at its extremity, may be withdrawn from the reel to the desired length so that the hook and the bait thereon may be permitted to dangle in the water below the ice, as illustrated. Because there is a tendency for ice to form in freezing weather on the surface of the water about the line and for such ice formation to hinder the desired free withdrawal of the line from the reel by a hooked fish, it is preferable that the line be protected from freezing water as by rubber or equivalent waterproof and flexible tubing 18 encompassing it at the water level sufficiently tightly to prevent water from reaching it at such level while at the same time enabling substantially unimpaired movement or withdrawal of the line through such tubing. When a fish is hooked, escape from the hook on account of the line being frozen is obviated, since the grip of the ice on the waterproof tubing is weak and, in any event, the line is readily pulled by the fish through the tubing so as to minimize its chances for working loose and escaping.

The trap of the present invention includes a flagging or signaling instrumentality which apprises the fisherman of his catch. Such instrumentality may comprise a resiliently flexible steel flag strip 19 which may carry a flag 20 suitably secured thereto at its upper end portion and a small ring 21 at its upper extremity adapted to engage a hook 22 projecting from the peripheral or marginal portion of an end disc 15 of the reel. The lower end portion of the strip 19 may be fixed, as by welding, to a collar or ferrule 23 adapted for sliding engagement over a cylindrical stud 24 projecting upwardly from and forming part of the knob 11. In setting the trap, the ferrule 23 is caused to engage the stud 24 and the strip 19 is bent downwardly with its ring 21 engaging the hook 22, as shown in Figure 1. When a fish is hooked and pulls on the line, the rotary movement of the reel brings about a disengagement of the flag strip and the reel and a flexing or flying upwardly of the strip into the dotted line position, shown in Figure 1, wherefore the fisherman knows of his catch. One of the end discs 15 of the reel is preferably provided with an outwardly projecting handle 25 to enable the fisherman to draw out the fish and rewind the line on the reel.

Once the fisherman is done with his fishing, the trap may be readily collapsed into a compact and easily transportable outfit. As shown in Figure 2, the lower end portions of the tri-pod legs 10 may be brought together and held in the ferrule 23 of the dismounted flag strip and the ring 21 at the upper end of such strip may be brought into engagement with a hook 26 projecting from the bracket wire 14 near the knob 11. It is a comparatively easy matter for the fisherman to slip the ferrule over the lower end leg portions and to push it up sufficiently on such portions to enable engagement of the hook 26 by the ring 21, whereupon the ferrule may be pulled downwardly to ensure a taut condition in the strip and concomitant bearing or frictional pressure by the inner strip or flag surface 27 against the reeled line, thereby preventing accidental withdrawal or tangling of the line while the trap is being transported. The cylindrical stud 24 is preferably hollow or recessed at its upper end portion and filled with cork or other comparatively soft material 28 into which the fish hook 17 may readily pierce so that the fish hook may, during transportation of the trap, be embedded in such filler, as illustrated in Figure 3, and thus be kept out of the way of possible accidental injury to the fisherman. By virtue of the springiness of the legs 10, when the ferrule 23 is disengaged therefrom, they immediately spring into their open or operative position, shown in Figure 1; and the trap may be set up by the fisherman with little effort and in very little time.

It is to be understood that the particular trap hereinbefore specifically described as embodying the principles of the present invention is susceptible of various changes or modifications without departing from the spirit or scope of the invention as defined in the appended claims.

I claim:—

1. The combination in a collapsible ice-fishing trap of resiliently flexible legs by which said trap may be supported on the ice, a knob from which said legs project, a reel on which a fishing line is wound and which is mounted for rotation below said knob and between said legs, a resiliently flexible signal-carrying strip equipped with a collar at its lower end, said collar being engageable over the upper portion of said knob so as to permit said strip to be flexed downwardly until the upper strip end is in proximity to said reel, and conjunctive means on said upper strip end and on said reel permitting hooked engagement therebetween and break of said engagement when the fishing line is withdrawn from said reel; said trap being collapsible by disengaging said collar from said knob, flexing the legs to bring their lower end portions together, and inserting said portions into said collar with said strip occupying a position between said legs and projecting toward said knob.

2. The combination in a collapsible ice-fishing trap of resiliently flexible tri-pod legs by which said trap may be supported on the ice, a knob from which said legs project, a reel on which a fishing line is wound fixedly located for rotation below said knob and between said legs, a bracket projecting downwardly from said knob and including an arbor portion on which said reel is freely rotatable, a resiliently flexible signal-carrying strip equipped with a collar at its lower end, said collar being engageable over the upper portion of said knob so as to permit said strip to be flexed downwardly until the upper strip end is in proximity to said reel, conjunctive means on said upper strip end and on said reel permitting hooked engagement therebetween and break of said engagement when the fishing line is withdrawn from said reel; said trap being collapsible by disengaging said collar from said knob, flexing the legs to bring their lower end portions together, and inserting said leg portions into said collar with said strip occupying a position between said legs and projecting toward said knob; and conjunctive means on said upper strip end and on said bracket permitting hooked engagement therebetween and the exertion of frictional pressure by said strip on the reeled fishing line when made taut during such engagement.

3. The combination in a collapsible ice-fishing trap of resiliently flexible legs by which said trap may be supported on the ice, a knob from which said legs project, a reel on which a fishing line carrying a fish hook at its extremity is wound and which is mounted for rotation below said knob and between said legs, a resiliently flexible signal-carrying strip equipped with a collar at its lower end, said collar being engageable over the upper portion of said knob so as to permit said strip to be flexed downwardly until the upper strip end is in proximity to said reel, and conjunctive means on said upper strip end and on said reel permitting hooked engagement therebetween and break of said engagement when the fishing line is withdrawn from said reel; said trap being collapsible by disengaging said collar from said knob, flexing the legs to bring their lower end portions together, and inserting said portions into said collar with said strip occupying a position between said legs and projecting toward said knob; and said upper knob portion having a recess filled with soft material into which said fish hook may readily pierce and be struck while the trap is collapsed.

BRONISLAW BARANOWSKI.